Patented Aug. 29, 1950

2,520,127

UNITED STATES PATENT OFFICE 2,520,127

METHOD OF PURIFYING RUTIN

James F. Couch, Glenside, and Joseph Naghski and William L. Porter, Philadelphia, Pa., assignors to the United States of America as represented by the Secretary of Agriculture No Drawing. Application October 31, 1947, Serial No. 783,427

5 Claims. (Cl. 260—210)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to the separation of rutin from mixtures of it and impurities, in particular where the impurity is quercetin, and has among its objects the provision of a method for separating rutin from the impurity with a high yield of substantially pure rutin.

Rutin, a glucoside of the flavonol group, which possesses valuable therapeutic properties, occurs in a wide variety of plants and can be isolated from the plant material by solvent extraction according to known processes. Rutin is readily degraded on hydrolysis to the corresponding aglucon, quercetin, and the preparation of rutin according to the usual processes sometimes yields products containing a relatively large amount of quercetin. Such products cannot be offered for sale as medicinal grade rutin, and heretofore no suitable method has been available for separating rutin from the quercetin.

In general, according to the present invention, rutin is separated from a mixture of it with quercetin by dissolving the mixture in a lower substantially anhydrous aliphatic alcohol to produce a rutin alcoholate, and immediately filtering the solution, if necessary to remove any alcohol insolubles. Upon standing, the rutin alcoholate, that is, rutin containing alcohol combined in molecular form, precipitates in the filtrate, the precipitate being recovered as by filtration.

Preferably, the precipitate thus obtained is then converted to rutin hydrate by interaction with water. The resulting hydrate is removed from the liquid phase as by filtering and then dehydrated in the usual manner by drying at 110° C. to obtain the substantially pure rutin.

The following examples illustrate the invention:

Example I 400 g. of absolute ethanol was heated nearly to boiling in a glass flask, and 16 g. of a mixture of rutin and quercetin containing 18.5 percent by weight of quercetin was added in portions. When the mixture was dissolved, the solution was filtered and allowed to cool. After standing 24 hours, the resulting precipitate was filtered off, washed with a small amount of cold absolute alcohol, and dried at 110° C. The product so obtained, weighing 9.03 g., was found to consist of 98 percent rutin containing no trace of quercetin, and 2 percent alcohol of crystallization.

Three grams of this product was mixed with 100 ml. of cold water in which it readily dissolved. After 24 hours, the solution was filtered from the rutin trihydrate which had separated and the precipitate was washed and dried at 110° C. The dry precipitate weighed 2.81 g. and consisted of quercetin-free rutin.

Example II 110.8 g. of rutin containing 6 percent by weight of quercetin was dissolved in 550 ml. of boiling absolute ethanol and the solution filtered. The precipitate which separated on cooling and standing was recovered by filtration.

This product was dissolved in 500 ml. of cold distilled water. The rutin hydrate precipitate formed on standing was filtered off and dried at 110° C. to constant weight. The yield was 63.8 g. anhydrous rutin containing no trace of quercetin.

Example III 670 g. of rutin containing 1 percent quercetin was dissolved in 3500 ml. of boiling absolute ethanol and the solution was filtered and allowed to stand until no further separation of a precipitate took place, after which the precipitate was filtered off.

This product was dissolved in 2 liters of distilled water. After standing overnight, the rutin hydrate was filtered off and dried at 110° C., yielding 527 g. of rutin free of quercetin.

Similar results were obtained in the procedure described in the foregoing examples using other anhydrous alcohols such as methanol, propanol or butanol in place of anhydrous ethanol. Although it is advantageous to form a concentrated alcoholic solution by dissolving the mixture of rutin and quercetin at temperatures near the boiling temperature of the solvent, solution can also be made at lower temperatures, and if necessary the alcoholic solution concentrated by evaporation to cause separation of the rutin alcoholate. The rutin alcoholate can be converted to rutin trihydrate by treatment with water at any temperature up to 100° C. It is not absolutely necessary to dissolve the alcoholate in water in order to convert it to the hydrate. This may also be effected on prolonged contact with water.

Having thus described the invention, what is claimed is:

1. In the method of separating rutin from mixtures of it and impurities, dissolving the mixture in a lower substantially anhydrous aliphatic alcohol to produce a rutin alcoholate, and separating the formed rutin alcoholate.

2. The method of claim 1, wherein the alcohol is ethanol.

3. A method of separation of rutin from a mixture of it and quercetin comprising dissolving the mixture in a lower substantially anhydrous aliphatic alcohol to produce a rutin alcoholate, separating the rutin alcoholate and converting the rutin alcoholate to rutin hydrate by interaction with water.

4. The method of claim 3, wherein the alcohol is ethanol.

5. The method of claim 3, wherein rutin alcoholate is converted to rutin hydrate by dissolving the rutin alcoholate in cold water and allowing the rutin trihydrate to separate from the solution.

JAMES F. COUCH.
JOSEPH NAGHSKI.
WILLIAM L. PORTER.

REFERENCES CITED

The following references are of record in the file of this patent:

Chemical Abstracts vol. 19 (1925), pages 92–93, 2 pages.